Patented May 22, 1934

1,959,507

UNITED STATES PATENT OFFICE 1,959,507

ORTHO - HYDROXYAZO - DYESTUFFS CONTAINING CHROMIUM AND PROCESS OF MAKING SAME

Fritz Straub and Willi Widmer, Basel, Switzerland, assignors to Society of Chemical Industry in Basle, Basel, Switzerland No Drawing. Application May 22, 1933, Serial No. 672,358. In Switzerland June 9, 1932

8 Claims. (Cl. 260—12)

The present invention relates to the manufacture of ortho-hydroxyazo-dyestuffs containing chromium. It comprises the process of making the same as well as the new products themselves.

It has been found that ortho-hydroxyazo-dyestuffs containing chromium which dye in red shades are produced by treating with an agent yielding chromium ortho-hydroxyazo-dyestuffs of the general formula

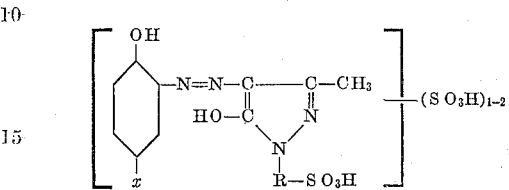

wherein $x$ represents a substituent selected from a group of substituents consisting of halogen, alkyl or alkoxy, and R an aryl radical.

The dyestuffs forming the parent materials for the invention may be made, for example, by combining a diazotized 4-halogen- or 4-alkyl- or 4-alkoxy-2-amino-1-phenolmonosulfonic acid with a 1-(mono- or di-sulfo)-aryl-3-methyl-5-pyrazolone, or by combining a diazotized 4-halogen- or 4-alkyl- or 4-alkoxy-2-amino-1-phenol with a 1-(disulfo)-aryl-3-methyl-5-pyrazolone.

Examples of diazo-components which come into consideration for the manufacture of the parent dyestuffs are the diazo-compounds of 4-chloro-2-amino-1-phenol-5- or 6-sulfonic acid, 4-methyl-2-amino-1-phenol-5- or 6-sulfonic acid, 4-methoxy-2-amino-1-phenol-5- or 6-sulfonic acid, 4-chloro- or 4-methyl- or 4-methoxy-2-amino-1-phenol, as well as the diazo-compounds of the corresponding bromo-, ethyl- and propyl-derivatives.

Examples of coupling components serving for the production of the parent dyestuffs are 1-(2'- or 3'-or 4'-sulfo)-phenyl-3-methyl-5-pyrazolone, 1-(2': 5'-disulfo)-phenyl-3-methyl-5-pyrazolone, 1-(2': 5'-dichloro - 4'-sulfo)-phenyl-3-methyl-5-pyrazolone, 1-(2'-methyl-5'-sulfo or 2'-ethyl-5'-sulfo)-phenyl-3-methyl-5-pyrazolone, 1-(2'-sulfo-4'-nitro)phenyl-3-methyl-5-pyrazolone, 1-(2'-hydroxy-3'-carboxy-5'-sulfo)phenyl-3-methyl-5-pyrazolone, 1-(2'-methyl-4'-sulfo)-phenyl-3-methyl-5-pyrazolone, 1-(2'-sulfo-4'-ethoxy)phenyl-3-methyl-5-pyrazolone, 1-(4'-sulfo-)α-naphthyl-3-methyl-5-pyrazolone and derivatives thereof further sulfonated or halogenated or nitrated in the naphthyl-residue.

The parent ortho-hydroxyazo-dyestuff may be treated with the agent yielding chromium in an acid, neutral or alkaline medium, in an open vessel or under pressure, and in presence or absence of suitable additional substances, for example alkali salts of inorganic or organic acids.

The chromium compounds obtainable by the invention are very freely soluble in water; they dye wool uniform pure red shades of very good fastness.

The following examples illustrate the invention, the parts being by weight:—

Example 1

224 parts of 4-chloro-2-amino-1-phenol-5-sulfonic acid are diazotized and coupled with 260 parts of 1-(3'-sulfo-)phenyl-3-methyl-5-pyrazolone in a solution which is alkaline with sodium carbonate. The dyestuff of the formula

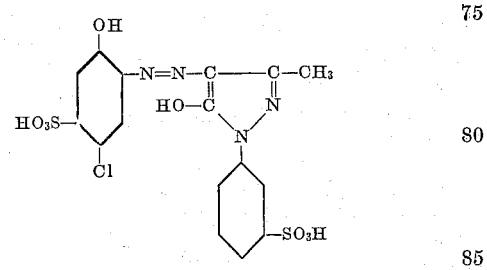

is salted out with common salt and filtered. The dyestuff paste so obtained is thereupon stirred with about 7000 parts of water and the whole is heated to boiling in a reflux apparatus with a solution of chromium sulfate, corresponding to 84 parts of chromium oxide, until chroming is completed.

The chromium compound of the dyestuff is then precipitated by the addition of common salt, filtered and dried. It is a brown red powder which is soluble in water to a red solution, in caustic soda solution or in sodium carbonate solution of 10 per cent. strength to an orange solution and in concentrated sulfuric acid to a yellow solution.

It dyes wool very even yellowish red shades of good fastness to light and to fulling.

Dyestuffs having similar tinctorial properties are obtained if the 1-(3'-sulfo-)phenyl-3-methyl-5-pyrazolone used in this example is replaced by the 1-(4'-sulfo-)phenyl-3-methyl-5-pyrazolone, or if the dyestuffs from diazotized 4-methyl-2-amino-1-phenol-6-sulfonic acid or 4-chloro-2-amino-1-phenol-6-sulfonic acid or 4-methyl-2-amino-1-phenol-5-sulfonic acid and 1-(4'-sulfo-)phenyl-3-methyl-5-pyrazolone are chromed according to the directions given in this example.

*Example 2*

224 parts of 4-chloro-2-amino-1-phenol-6-sulfonic acid are suspended in 1000 parts of water and diazotized in the usual manner by means of 69 parts of sodium nitrite. The diazo-solution is allowed to run into a mixture, cooled with ice, of 900 parts of water, 260 parts of 1-(3'-sulfo-)-phenyl-3-methyl-5-pyrazolone, 42 parts of caustic soda and 120 parts of calcined sodium carbonate, whilst stirring. After a short time coupling is complete and the dyestuff of the formula

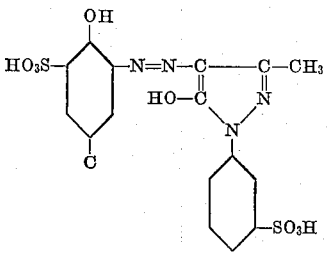

is completely precipitated by the addition of common salt. The filtered dyestuff is then stirred with 7000 parts of water and mixed with a chromium sulfate solution prepared from 84 parts of chromium oxide and 160 parts of concentrated sulfuric acid. The whole is heated to boiling in a reflux apparatus until chroming is finished, whereupon the chromium compound of the dyestuff is precipitated by means of common salt. It is a brown red powder which is soluble in water to a red solution, in caustic soda solution or sodium carbonate solution of 10 per cent. strength to an orange solution and in concentrated sulfuric acid to a yellow brown solution. The dyestuff dyes wool in a sulfuric acid bath very even yellowish red shades which are distinguished by a good fastness towards light and milling.

A dyestuff having similar properties is obtained by chroming in the manner described in this example the dyestuff from diazotized 4-chloro-2-amino-1-phenol-6-sulfonic acid and 1-(2'-sulfo-)-phenyl-3-methyl-5-pyrazolone.

*Example 3*

490 parts of the dyestuff of the formula

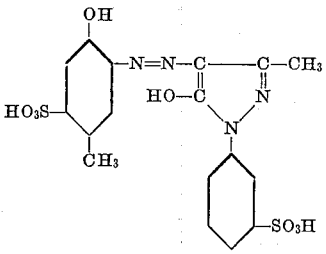

from diazotized 4-methyl-2-amino-1-phenol-5-sulfonic acid and 1-(3'-sulfo-)phenyl-3-methyl-5-pyrazolone, 5000 parts of water and a chromium sulfate solution corresponding with 78 parts of chromium oxide are heated to boiling in a reflux apparatus. When chroming is finished the solution of the dyestuff is neutralized by means of sodium carbonate, filtered if necessary, and then evaporated to dryness under reduced pressure. The chromium compound of the dyestuff so obtained is a brown red powder which is very freely soluble in water and in caustic soda or sodium carbonate solution of 10 per cent. strength to an orange red solution, and in concentrated sulfuric acid to a yellow brown solution. The dyestuff dyes wool in an acid bath very even red shades of very good fastness to light and milling.

In like manner can be prepared the chromium compound of the dyestuff from diazotized 4-methyl-2-amino-1-phenol-6-sulfonic acid and 1-(3'-sulfo-)phenyl-3-methyl-5-pyrazolone. The tinctorial properties of this dyestuff resemble those of the dyestuff described in the first paragraph of this example.

*Example 4*

224 parts of 4-chloro-2-amino-1-phenol-6-sulfonic acid are diazotized and coupled in an alkaline solution with 330 parts of 1-(2':5'-dichloro-4'-sulfo-)phenyl-3-methyl-5-pyrazolone. The dyestuff of the formula

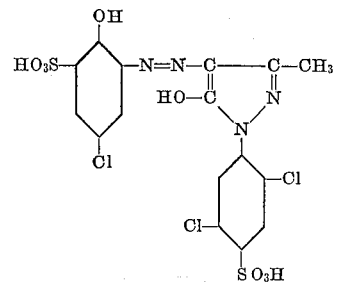

which precipitates is filtered and the dyestuff paste so obtained is stirred with 8000 parts of water. There is then added a chromium sulfate solution, corresponding with 80 parts of chromium oxide, and the whole is heated to boiling in a reflux apparatus, until chroming is complete, whereupon the dyestuff is precipitated by addition of common salt and filtered. The dry dyestuff is a brown red powder which dissolves in water or in a sodium carbonate solution of 10 per cent. strength to an orange red solution, in a caustic soda solution of 10 per cent. strength to an orange yellow solution and in concentrated sulfuric acid to a yellow solution. The dyestuff dyes wool very even yellow red shades of good fastness to fulling and of very good fastness to light.

If in this example instead of 1-(2':5'-dichloro-4'-sulfo-)phenyl-3-methyl-5-pyrazolone, there is used as the coupling component 1-(2'-methyl-4'-sulfo-) or 1-(4'-nitro-2'-sulfo-) or 1-(2'-hydroxy-3'-carboxy-5'-sulfo-)phenyl-3-methyl-5-pyrazolone, there are obtained dyestuffs having similar properties; similar dyestuffs are also obtained if instead of the diazo-component used in this example there is used 4-methyl-2-amino-1-phenol-6-sulfonic acid.

*Example 5*

143.5 parts of 4-chloro-2-amino-1-phenol are diazotized in hydrochloric acid solution in the usual manner and coupled in an alkaline solution with 340 parts of 1-(2':5'-disulfo-)phenyl- 3-methyl-5-pyrazolone and the dyestuff of the formula

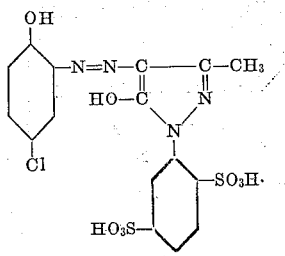

is salted out with common salt and filtered. The dyestuff paste so obtained is mixed with about 6500 parts of water and a chromium sulfate solution, corresponding with 84 parts of chromium oxide, and the whole is heated to boiling for about 18 hours in a reflux apparatus. The chromium compound of the dyestuff is precipitated by means of common salt and filtered. When dry it is a brown red powder which is soluble in water to an orange red solution, in caustic soda solution or sodium carbonate solution of 10 per cent. strength to a yellow orange solution and in concentrated sulfuric acid to a yellow solution. The dyestuff dyes wool very even yellowish red shades of good fastness to light and milling.

A dyestuff having similar properties is obtained if 4-methyl-2-amino-1-phenol is used in place of the diazo-component prescribed in this example.

Example 6

The dyestuff of the formula

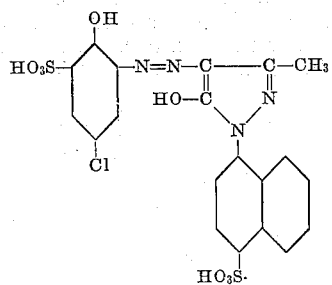

prepared in the usual manner from 224 parts of 4-chloro-2-amino-1-phenol-6-sulfonic acid and 312 parts of 1-(4'-sulfo-)α-naphthyl-3-methyl-5-pyrazolone is mixed with 10,000 parts of water and a solution of chromium sulfate, corresponding with 84 parts of chromium oxide, and the whole is heated to boiling in a reflux apparatus for about 20 hours; the chromium compound of the dyestuff is precipitated by means of common salt, filtered and dried. It is a brown red powder which is soluble in water and in sodium carbonate solution or caustic soda solution of 10 per cent. strength to an orange red solution, and in concentrated sulfuric acid to a yellow solution. The dyestuff dyes wool in a sulfuric acid bath even yellowish red shades of very good fastness to light and milling.

Chromium compounds having similar properties are obtained if the chroming is conducted with another agent yielding chromium, for example chromium formate, chromium chloride or chromium fluoride.

Example 7

A dye-bath is prepared with 3 per cent. of sulfuric acid of 66° Bé. and wool is treated in this bath for 10 to 15 minutes at 60° C. The thoroughly dissolved dyestuff is thereupon added to the bath, dyeing is conducted for ½ hour at 60° C., the temperature of the bath is slowly raised to boiling and a further 5 per cent. of sulfuric acid of 66° Bé. is added. Boiling is continued for ½ to ¾ hour in order to complete the development of the dyeing.

What we claim is:—

1. Process for the manufacture of ortho-hydroxyazo-dyestuffs containing chromium which dye in red shades, consisting in treating with agents yielding chromium ortho-hydroxyazo-dyestuffs of the general formula

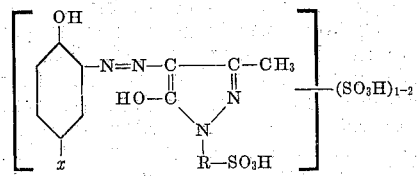

wherein $x$ represents a substituent selected from a group of substituents consisting of halogen, alkyl and alkoxy, and R an aryl radical.

2. Process for the manufacture of ortho-hydroxyazo-dyestuffs containing chromium which dye in red shades, consisting in treating with agents yielding chromium ortho-hydroxyazo-dyestuffs of the general formula

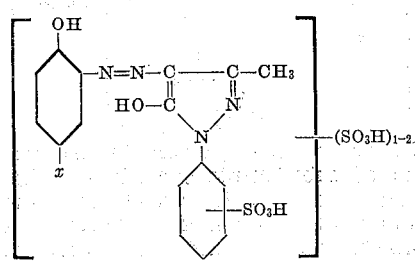

wherein $x$ represents a substituent selected from a group of substituents consisting of halogen, alkyl and alkoxy.

3. Process for the manufacture of ortho-hydroxyazo-dyestuffs containing chromium which dye in red shades, consisting in treating with agents yielding chromium ortho-hydroxyazo-dyestuffs of the general formula

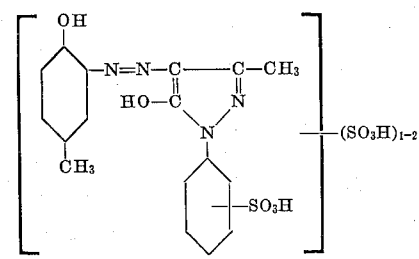

4. Process for the manufacture of an ortho-hydroxyazo-dyestuff containing chromium which dyes in red shades, consisting in treating with agents yielding chromium an ortho-hydroxyazo-dyestuff of the formula

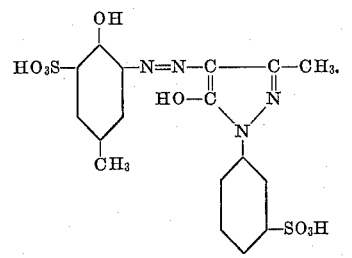

5. Ortho - hydroxyazo - dyestuffs containing chromium which dye in red shades and correspond with the general formula

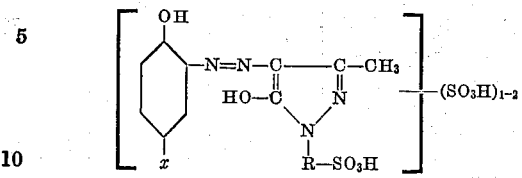

wherein $x$ represents a substituent selected from a group of substituents consisting of halogen, alkyl and alkoxy, and R an aryl radical, which products are brown-red powders dissolving in water to orange-red to red solutions, in dilute caustic soda solution and sodium carbonate solution to yellow to orange-yellow to orange to orange-red solutions, and in concentrated sulfuric acid to yellow to yellow-brown solutions.

6. Ortho - hydroxyazo - dyestuffs containing chromium which dye in red shades and correspond with the general formula

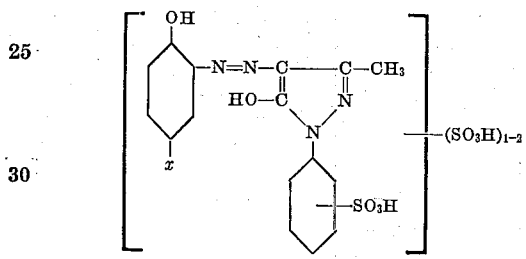

wherein $x$ represents a substituent selected from a group of substituents consisting of halogen, alkyl and alkoxy, which products are brown-red powders dissolving in water to orange-red to red solutions, in dilute caustic soda solution and sodium carbonate solution to yellow to orange-yellow to orange to orange-red solutions, and in concentrated sulfuric acid to yellow to yellow-brown solutions.

7. Ortho - hydroxyazo - dyestuffs containing chromium which dye in red shades and correspond with the general formula

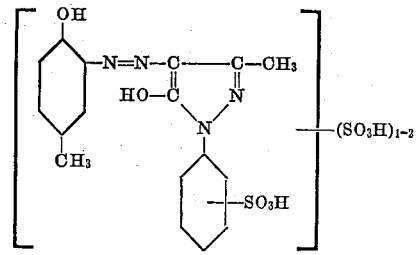

which products are brown-red powders dissolving in water and in dilute caustic soda solution as well as in sodium carbonate solution to orange-red solutions, and in concentrated sulfuric acid to yellow-brown solutions.

8. The ortho-hydroxyazo-dyestuff containing chromium which dyes in red shades and which corresponds with the formula

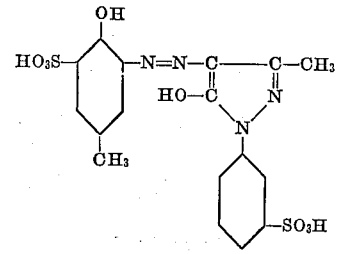

which product is a brown-red powder dissolving in water and in dilute caustic soda solution as well as in sodium carbonate solution to an orange-red solution and in concentrated sulfuric acid to a yellow-brown solution.

FRITZ STRAUB.
WILLI WIDMER.